United States Patent [19]

Osanai

[11] 4,113,192

[45] Sep. 12, 1978

[54] APPARATUS FOR WITHDRAWING THE TONGUE OF A FILM INCORPORATED IN A CARTRIDGE

[75] Inventor: Shinichi Osanai, Ichikawa, Japan

[73] Assignee: Labogiken Co., Ltd., Tokyo, Japan

[21] Appl. No.: 838,059

[22] Filed: Sep. 30, 1977

[30] Foreign Application Priority Data

Oct. 4, 1976 [JP] Japan .................................. 51-119174
Feb. 25, 1977 [JP] Japan ............................. 52-22194[U]
Feb. 25, 1977 [JP] Japan ............................. 52-22195[U]

[51] Int. Cl.² ........................... G03B 1/02; B25B 9/00
[52] U.S. Cl. ......................................... 242/1; 81/3 R;
226/92; 242/55; 242/71.1
[58] Field of Search ................... 242/55, 71.1, 1, 195;
81/3 R; 226/92, 91

[56] References Cited

U.S. PATENT DOCUMENTS

| | | | |
|---|---|---|---|
| 3,261,237 | 7/1966 | Sentiff ..................................... | 81/3 R |
| 3,724,776 | 4/1973 | McKee .................................. | 242/195 |
| 3,838,833 | 10/1974 | Hopfner et al. ...................... | 242/195 |
| 4,047,653 | 9/1977 | Starr ...................................... | 81/3 R |

*Primary Examiner*—George F. Mautz
*Attorney, Agent, or Firm*—Fleit & Jacobson

[57] ABSTRACT

This invention relates to an apparatus for withdrawing the tongue of an exposed film incorporated in a cartridge. A thin resilient guide member is mechanically inserted into the cartridge. After insertion of the guide member into the cartridge, a thin resilient film withdrawal strip with hooks is inserted into the cartridge in the same manner and then, retracted from cartridge to withdraw the film by engagement of the hooks with perforations in the film.

5 Claims, 6 Drawing Figures

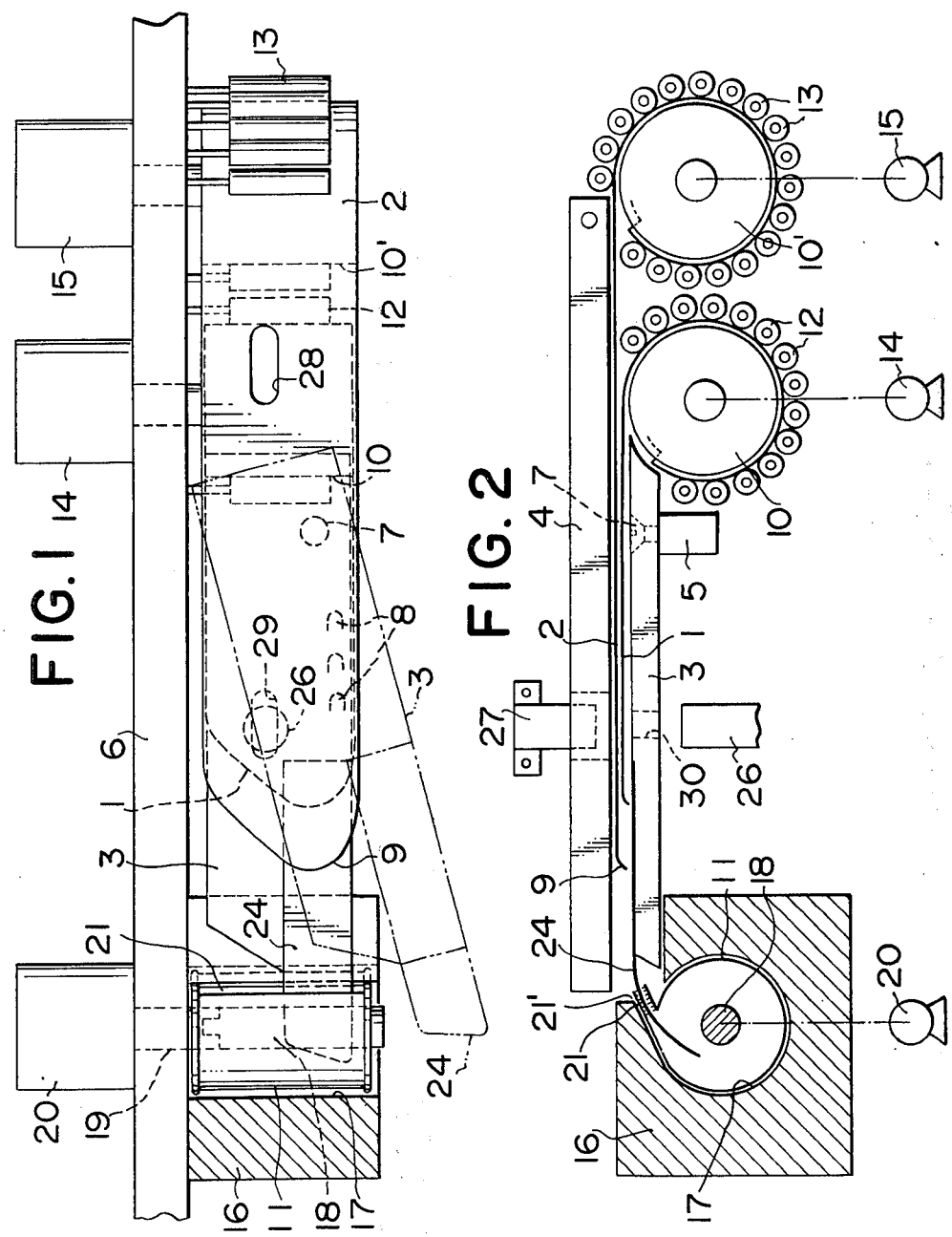

APPARATUS FOR WITHDRAWING THE TONGUE OF A FILM INCORPORATED IN A CARTRIDGE

BACKGROUND OF THE INVENTION

This invention relates to a apparatus for taking out the leading edge of an exposed film from its cartridge.

A main object of the present invention is to provide a tongue withdrawal apparatus which mechanically carries out a so-called tongue withdrawal operation of exposed film incorporated in a cartridge. According to the present invention, this object is achieved by providing an apparatus comprising a thin resilient film withdrawal strip having hooks formed in the forward portion thereof and adapted to engage the film perforations, a thin resilient guide member having an inwardly curved tip, a support plate positioned below said strip to support it and said guide member, means for moving said guide member towards and away from the cartridge to sufficiently insert said guide member into the cartridge through its film withdrawal port and to retract said guide member from the cartridge, means for turning the cartridge spool several times so that the curved tip of said guide member always contacts the outermost portion of the wound film from the outside after said guide member has been inserted in said cartridge, means for moving said film withdrawal strip toward and away from the cartridge to introduce said film withdrawal strip into the cartridge through its film withdrawal port from between the support plate and said guide member which has been inserted in the cartridge and to withdraw said film withdrawal strip so as to withdraw the film from the cartridge by means of engagement between the hooks of said film withdrawal strip and the perforations of the film, and, in a case where the film has not been withdrawn, said means for turning the spool being operated to turn the spool again so as to change the position of the film end, and said means for moving said film withdrawal strip being operated to repeatedly introduce said film withdrawal strip into the cartridge and to withdraw the film from the cartridge.

In a preferred embodiment, the thin resilient film withdrawal strip is of material such as stainless steel or plastics, the hooks formed in the forward portion of said thin strip are surrounded by punched holes terminating adjacent the base thereof, are positioned in the same plane as that of said thin strip when said film withdrawal strip is in a retructed flat state, and are allowed to obliquely project from said thin strip when said strip is inserted into the cartridge to curve. Preferably, there is provided a cartridge holder having a pocket for receiving the cartridge, and the support plate has an extremely thin resilient guiding strip attached thereto so as to extend into the pocket of the cartridge holder beyond the forward edge thereof. The guiding strip enables said support plate to move together with a cartridge, from a position at which the forward portion of the guiding strip is inserted into the cartridge, to a position at which the cartridge is accommodated in the pocket of a cartridge holder. The support plate is preferably pivoted to a frame at the rear end thereof. As can be understood, when the cartridge is retained inside the pocket of the cartridge holder, the forward portion of the guiding strip positioned below the guide member and the film withdrawal strip is inserted into the cartridge. For this reason, the guide member and the withdrawal strip sequentially caused to advance are guided by the upper surface of the guiding strip and smoothly introduced into the cartridge without becoming snagged at the entrance of the cartridge irrespective of variations in its shape and size.

A preferred embodiment of the present invention will be explained in further detail with reference to the accompanying drawings.

FIG. 1 is a top plan view showing a preferred embodiment of an apparatus according to the present invention;

FIG. 2 is a front elevational view of the apparatus shown in FIG. 1;

Figure 3:
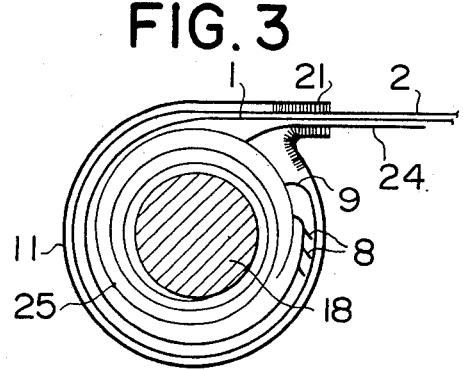
FIGS. 3 and 4 are cross-sectional views each showing the relation between the film withdrawal strip and the guide member and the film inside the cartridge.

In FIG. 1, an apparatus according to the invention comprises thin, resilient film withdrawal strip 1 and a thin resilient guide member 2 made of material such as stainless steel or plastic and positioned between a support plate 3 and a guide plate 4. The guide plate 4 is suitably supported from a frame (not shown) while the support plate 3 is pivotably attached to a support block 5 on a side plate 6 of the frame, as shown at 7 in FIG. 1. The withdrawal strip 1 is provided at its forward portion with a plurality of hooks 8 which are adapted to engage the perforations of the film and the guide member 2 has a curved tip 9. Their rear sections of the film withdrawal strip 1 and guide member 2 are wound around the circumference of respective rotary drums 10, 10' supported on the side plate 6 and secured thereto at ends thereof. A number of guide rollers 12, 13 are rotatably supported on the side plate 6 so as to position around the circumference of these rotary drums 10, 10' and serve to accurately feed out the withdrawal strip 1 and the guide member 2 when the rotary drums rotate. The rotary drums 10, 10' are driven through reduction gears by reversible motors 14, 15.

A cartridge holder 16 is secured on the side plate 6 adjacent the forward ends of the support and guide plates 3, 4 and provided with a pocket 17 for receiving a cartridge 11 of the exposed film of which the tongue is to be pulled out. A spool 18 within the cartridge is connected to a rotary shaft 19 which extends through the side plate 6 into the pocket 17 and is driven through a reduction gear by a motor 20. The cartridge is positioned within the pocket so that the film withdrawal port 21 faces the withdrawal strip 1 and the guide member 2 through an opening 21' communicating with the pocket 17.

Figure 5:
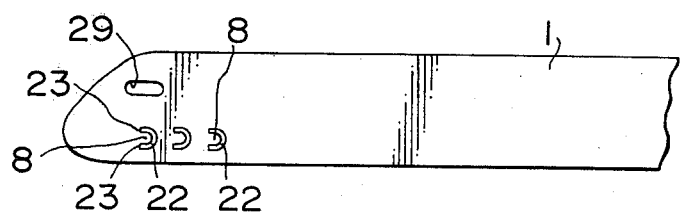
FIG. 5 is a top plan view of the film withdrawal strip.
Figure 6:
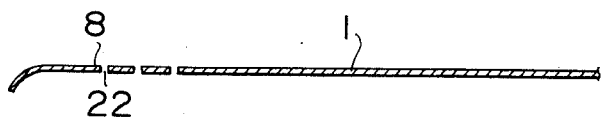
FIG. 6 is a longitudinal cross-sectional view of the film withdrawal strip.

The hooks 8 are surrounded by punched holes 22 terminating adjacent the base of the hooks as shown in detail in FIGS. 5 and 6 to define ends 23, 23 of the holes. The hooks 8 are arranged in such a manner that when the film withdrawal strip is kept in a flat state, that is, when it is not yet inserted into the cartridge 11, they are in the same plane as that of the strip 1 as illustrated in FIGS. 5 and 6. When the film withdrawal strip is inserted into the cartridge 11 of an exposed film, the hooks 8 of the strip 1 gradually become erect as the strip 1 is being curled in a curved configuration inside the cartridge 11 till they obliquely project to such an extent as to engage the perforations of the film and thus form hooking pawls for the perforations. In the subsequent withdrawal operation, the strip 1 is withdrawn from the film cartridge while the obliquely projecting hooks 8 engage with the perforations of the film.

A thin resilient guiding strip 24 made of stainless steel or a synthetic resin is secured on the forward section of the support plate 3 and has the forward portion which extends into the pocket 17 in the cartridge holder 16 beyond the support plate 3. The support plate 3 is pivoted at its rear end to the support block 5 as set forth above to swing about the pivotal point 7 between a position in which it is parallel to the guide member and withdrawal strip and a position in which it is deviated to the side thereof.

When the support plate 3 and hence the guiding strip 24 are disposed to the side, and the forward portion of the guiding strip 24 is inserted into the cartridge 11, the cartridge is moved towards the pocket 17 of the cartridge holder 16 so that it is accommodated in the pocket 17. Due to movement of the cartridge 11, the guiding strip 24 is swung to the position below the film withdrawal strip 1 as indicated by the solid line in FIG. 1.

In operation, as the cartridge 11 is received within the pocket 17 to connect the spool 18 with the shaft 19, the motor 15 is operated to rotate the drum 10' in the counter-clockwise direction. The rotation of the drum 10' causes the guide member 2 to advance towards the cartridge 11 and to insert into the cartridge 11 through the film withdrawal port 21. At this time, the guide member 2 smoothly enters the film withdrawal port 21 of the cartridge 11 while the curved tip of the guide member 2 is being guided by the upper surface of the guiding strip 24 which has been received in the cartridge 11. Then, the rotary shaft 19 is rotated by the motor 20 to turn the spool 18 several times. In this instance, even if the guide member 2 is inserted under the outermost winding of the film 25 wound around the spool 18 (see FIGS. 3 and 4), rotation of the spool, i.e., the film, allows the outermost winding of the film to slip out from the curved tip 9 of the guide member 2. Consequently, the curved tip 9 of the guide member 2 contacts the outermost winding of the film and slightly presses it inward.

Next, as the motor 14 is operated to rotate the drum 10 in the counterclockwise direction, the film withdrawal strip 1 is advanced due to the rotation of the drum 10 and is inserted into the cartridge 11 through the film withdrawal port between the preciously inserted guide member 2 and the guiding strip 24. The hooks 8 of the strip 1 gradually become erect as strip 1 is being curled in a curved configuration inside the cartridge 11 until they obliquely project to such an extent as to engage the perforation of the film 25 and thus form hooking pawls for perforations. After the withdrawal strip 1 has been inserted into the cartridge 11, the rotary drum 10 is rotated in the reverse direction whereby the film withdrawal strip 1, due to the presence of the guide member 2, is smoothly pulled out of the cartridge 11 without its hooks snagging the light-shielding cloth of the cartridge. At this time, the hooks 8 return to the plane of the strip 1. If the end of the film withdrawal tab and that of the film are kept in such a relation as shown in FIG. 3, the withdrawal strip 1 will be withdrawn from the cartridge 11 without engagement of the hooks 8 with the perforations of the film. It is therefore obvious that the film cannot be withdrawn.

A suitable sensing device detects whether or not withdrawal of the film has accompanied the manipulation of the film withdrawal strip 1. In the embodiment shown in the drawing, this sensing device includes a lamp 26 and a photoelectric cell 27. When the guide member 2 has been inserted in the cartridge 11, an opening 28 in the guide member 2 is positioned between the lamp 26 and the photoelectric cell 27. The strip 1 has an opening 29 formed therein so as to align with the sensing device when the strip 1 is in the retracted position. When the photoelectric cell 27 receives light from the lamp 26 through the openings 28, 29 and an opening 30 formed in the support plate 3 after the strip 1 has been withdrawn from the cartridge 11, the sensing device detects that the film has not been withdrawn. Due to this detection, the motor 20 is actuated to rotate the rotary shaft 19 thereby to slightly turn the spool 18 and thus to change the position of the end of the film. After rotation of the spool 18, the rotary drum 10 is again rotated so as to advance and insert the withdrawal strip 1 into the cartridge 11 in the same way as mentioned above.

Figure 4:
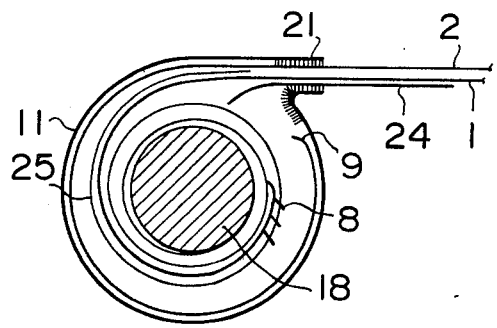

By way of example, when the film end that has previously been pressed by the curved tip 9 of the guide member 2 as shown in FIG. 3 is freed from the pressing action of the curved tip as shown in FIG. 4, a sufficient gap is defined between the film end and the winding layer immediately below it. Thus the film withdrawal strip 1 penetrates into the film windings through this gap and provides its hooks with an opportunity for engaging the perforations of the film.

Next, when the rotary drum 10 reversely rotates again, the film withdrawal strip 1 is withdrawn from the cartridge while accompanying the film because of the engagement between its hooks 8 and the perforations of the film. As the withdrawn film end is positioned to interrupt the light from the lamp 26 to the cell 27, the aforementioned sensing device detects the withdrawal of the end of the film and due to this, the rotary drum 10 is slightly rotated so as to advance the film withdrawal strip to an enough extent to disengage the hooks 8 from the perforations at the leading edge of the film. Since the punched hole 22 surrounds each hook 8 up to the sides of the base thereof, the hooks 8 do not strongly plunge into the film perforations during the film withdrawal operation. In other words, the hooks 8 deeply and securely engage the perforations until the edges of the perforations abut the ends 23, 23 of the punched hole 22. When the film withdrawal strip is moved slightly towards the holder relative to the withdrawn film end, the hooks 8 are easily extracted from the perforations because the hooks are not allowed to strongly plunge into the perforations due to the presence of the punched holes that function as an escape. Subsequently, the rotary drum 10' is rotated in the reverse direction and the guide member 2 is withdrawn from the cartridge, thereby completing the tongue withdrawal operation of the film. If the film withdrawal is not successful, manipulation of the film withdrawal strip is repeated without taking out the guide member.

After the withdrawal strip 1 and the guide member 2 have been withdrawn, the film cartridge 11 is removed from the pocket 7 of the cartridge holder 16 whereby the guiding strip 24 together with the support plate 3 swings to the position indicated by the broken line in FIG. 1. Hence, the forward edge of the guiding strip 24 can be withdrawn from the cartridge 11.

In the above-mentioned embodiment, the insertion of the withdrawal strip and guide member into the cartridge and their subsequent withdrawal is accomplished through the rotation of the rotary drums. However, it should be understood that the process of the present invention could be similarly carried out using any desired apparatus so long as it permits the film withdrawal strip and guide member to be inserted into and withdrawn from the cartridge.

As can be clearly understood from the foregoing description, in accordance with the apparatus of this invention, the film withdrawal tab having the hooks is inserted into and then withdrawn from the film withdrawal port of the cartridge from between the guide member and the guiding strip which have been inserted beforehand. For this reason, the withdrawal tab never snag the light-shielding cloth provided at the film withdrawal port of the cartridge. In addition, since the curved tip section of the guide member presses the wound portion of the film on the spool from the outside, a large gap is defined between the leading edge of the film and the wound portion of the film immediately below as soon as the leading edge is freed from the pressing action of the curved tip section of the guide member. This gap facilitates the introduction of the film withdrawal tab under the leading edge of the film.

In accordance with the present invention, the forward portion of the guiding strip 24 is inserted in advance into the cartridge 11 to be retained by the cartridge holder 16 and functions to guide the guide member and the film withdrawal strip into the entrance of the cartridge, thereby perfectly solving the problem in which the guide member and the withdrawal strip snag at the entrance to the cartridge and are thus prevented from entering it smoothly.

As described above, since the hooks of the film withdrawal strip of the present invention are, under normal condition, kept in the same plane as that of the strip, the withdrawal strip can be very easily inserted into the cartridge. When the withdrawal strip is inserted into the cartridge, the hooks are caused to erect in an inclined manner due to curling of the strip. For this reason, the film withdrawal strip is not beset by the problem encountered in the conventional hooks, which are already obliquely erect before insertion into the cartridge and thus become unnecessarily erect after insertion. Consequently, engagement becomes more reliable between the hooks and the perforations of the film.

Moreover, during the withdrawal operation of the film, the hooks are rendered flat as the strip returns from the curled state to the flat state, and thus provide reliable engagement with the perforations of the film. The hooks, due to their surrounding holes, are not permitted to plunge into the perforations with unnecessary force. In addition, the hooks can be easily disengaged from the perforations without any resistance if the withdrawal strip is returned by shifting it slightly toward the film.

What is claimed is:

1. An apparatus for withdrawing the tongue of an exposed film incorporated in a cartridge using a thin resilient film withdrawal strip having hooks formed in the forward portion thereof and adapted to engage the film perforations, a thin resilient guide member having an inwardly curved tip and disposed above said film withdrawal strip, a support plate positioned below said strip to support it and said guide member, means for moving said guide member towards and away from the cartridge to sufficiently insert said guide member into the cartridge through its film withdrawal port and to retract said guide member from said cartridge, means for turning the cartridge spool several times so that the curved tip of said guide member always contacts the outermost portion of the wound film from the outside after said guide member has been inserted in said cartridge, means for moving said film withdrawal strip towards and away from said cartridge to introduce said film withdrawal strip into the cartridge through its film withdrawal port from between said support plate and said guide member inserted in said cartridge and to withdraw said film withdrawal strip so as to withdraw the film from the cartridge by means of engagement between the hooks of said film withdrawal strip and the perforations of the film and, in a case where the film has not been withdrawn, said means for turning said spool being operated to turn the spool again so as to change the position of the film end and said means for moving said film withdrawal strip being operated to repeatedly introduce said film withdrawal strip into the cartridge and to withdraw the film from the cartridge.

2. An apparatus as set forth in claim 1 wherein said thin resilient film withdrawal strip is of material such as stainless steel or plastics, said hooks formed in the forward portion of said strip are surrounded by punched holes terminating adjacent the base thereof, are positioned in the same plane as that of said strip when it is in a retracted flat state, and are allowed to obliquely project from the strip when it is inserted into said cartridge to curve.

3. An apparatus as set forth in claim 1 wherein there is provided a cartridge holder having a pocket for receiving the cartridge, and said support plate has an extremely thin resilient guiding strip attached thereto so as to extend into the pocket of said cartridge holder, said guiding strip being inserted in said cartridge to facilitate insertion of said guide member and said film withdrawal strip into the film withdrawal port of said cartridge.

4. An apparatus as set forth in claim 3 wherein said support plate is pivotably supported at its rear end so as to move from a position at which the forward portion of said guiding strip is inserted into said cartridge to a position at which said cartridge together with said guiding strip is accommodated in the pocket of the cartridge holder.

5. An apparatus as set forth in claim 1 wherein said means for moving said guide member and said film withdrawal strip include rotary drums supported on a frame side plate and reversible motors for rotating said drums, said guide member and said film withdrawal strip have rear portions wound around said rotary drums, the ends of said rear portions being attached to the rotary drums, and a plurality of guide rollers rotatably supported on said side plate and positioned around each of said drums so as to guide said rear portion of each of said guide member and film withdrawal strip along the circumference of each drum during its rotation.

* * * * *